United States Patent
Tuffs et al.

(10) Patent No.: US 10,318,399 B2
(45) Date of Patent: Jun. 11, 2019

(54) USING CANARY INSTANCES FOR SOFTWARE ANALYSIS

(71) Applicant: Netflix, Inc., Los Gatos, CA (US)

(72) Inventors: Philip Simon Tuffs, Pacific Grove, CA (US); Roy Rapoport, Pacifica, CA (US); Ariel Tseitlin, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 541 days.

(21) Appl. No.: 13/796,923

(22) Filed: Mar. 12, 2013

(65) Prior Publication Data
US 2014/0282422 A1    Sep. 18, 2014

(51) Int. Cl.
*G06F 9/44* (2018.01)
*G06F 11/34* (2006.01)

(52) U.S. Cl.
CPC ...... *G06F 11/3452* (2013.01); *G06F 11/3428* (2013.01); *G06F 2101/00* (2013.01); *G06F 2201/865* (2013.01)

(58) Field of Classification Search
CPC .......... G06F 2101/00; G06F 2201/865; G06F 2200/00; G06F 2201/00; G06F 2209/501; G06F 11/3409; G06F 2201/9865; G06F 11/3452; H04L 67/32; H04L 41/0896; H04L 41/22; H04L 43/0888; H04L 67/36; H04L 67/42; G06Q 30/0201
See application file for complete search history.

(56) References Cited

U.S. PATENT DOCUMENTS

| | | | |
|---|---|---|---|
| 2003/0237094 A1* | 12/2003 | Kurapati et al. | ................. 725/46 |
| 2008/0244534 A1 | 10/2008 | Golender et al. | |
| 2008/0282254 A1 | 11/2008 | Blander et al. | |
| 2009/0172664 A1 | 7/2009 | Mostafa | |

(Continued)

OTHER PUBLICATIONS

Todd Hoff, "Netflix: Developing, Deploying, and Supporting Software According to the way of the Cloud", Dec. 2011, pp. 1-5 <ToddHoff_11.pdf>.*

(Continued)

*Primary Examiner* — Tuan A Vu
(74) *Attorney, Agent, or Firm* — Artegis Law Group, LLP

(57) ABSTRACT

Techniques for evaluating a second version of software. Embodiments selectively route incoming requests to software instances within a plurality of baseline instances and a plurality of canary instances, where the baseline instances run a first software version and the canary instances run the second software version. The software instances are monitored to collect performance data for a plurality of performance metrics. Embodiments calculate aggregate baseline performance metrics, where each of the aggregate baseline performance metrics is calculated based on the collected performance data for the plurality of baseline instances. For each of the performance metrics and canary instances, embodiments calculate a relative performance value that measures the collected performance data for the respective canary instance and for the respective performance metric, relative to the corresponding aggregate baseline performance metric. A final measure of performance is calculated for the second version of software, based on the relative performance values.

14 Claims, 7 Drawing Sheets

(56) References Cited

U.S. PATENT DOCUMENTS

| | | |
|---|---|---|
| 2010/0107145 A1 | 4/2010 | Warren et al. |
| 2010/0229096 A1* | 9/2010 | Maiocco et al. ............. 715/734 |
| 2010/0325616 A1 | 12/2010 | Singonahalli et al. |
| 2011/0208808 A1* | 8/2011 | Corbett ......................... 709/203 |
| 2012/0017165 A1* | 1/2012 | Gardner et al. ............. 715/771 |
| 2012/0060146 A1* | 3/2012 | Maurer ......................... 717/110 |
| 2012/0137367 A1* | 5/2012 | Dupont et al. .................. 726/25 |
| 2012/0221407 A1* | 8/2012 | Erasmus et al. ........... 705/14.43 |
| 2013/0339519 A1* | 12/2013 | Lientz ........................... 709/224 |
| 2014/0068053 A1* | 3/2014 | Ravi et al. .................... 709/224 |

OTHER PUBLICATIONS

David Mytton, "Canary concept for system updates" Nov. 2012, p. 1-2 <DMytton_2012.pdf>.*

International Search Report and Written Opinion, dated Aug. 11, 2014, in corresponding international patent application No. PCT/US2014/024349.

* cited by examiner though few are developed as a single large software application to provide every facet of a modern software solution are made up of a substantial number of different services that are designed to work together to provide the functionality of the overall system. For instance, rather than writing a single standalone application that provides an online content streaming service, such a service could be provided by tens or even hundreds of smaller software services, each designed to perform a specific set of tasks, and that work together to provide the content streaming service. Doing so has several pronounced advantages. For instance, it can be easier to compartmentalize the development of the software application, as each standalone service can be assigned to a small group of programmers for implementation. This helps to alleviate complicated merge operations and troubleshooting operations during the development process, as each standalone service can be compiled and tested individually. Additionally, doing so greatly improves the modularity of the software solution, allowing individual services to be easily removed and replaced with updated services that perform the same task. As yet another advantage, such a modularized design allows the software solution to be easily distributed and redistributed over multiple different compute nodes (either physical or virtual), based on how the different services are positioned and configured.

USING CANARY INSTANCES FOR SOFTWARE ANALYSIS

BACKGROUND OF THE INVENTION

Field of Invention

Embodiments of the present invention generally relate to software correctness and performance during deployment, and more specifically to techniques for evaluating a software application relative to another software application that performs the identical function(s).

Description of Related Art

Rather than relying on a single large software application to provide every facet of a modern software solution, many software solutions today are made up of a substantial number of different services that are designed to work together to provide the functionality of the overall system. For instance, rather than writing a single standalone application that provides an online content streaming service, such a service could be provided by tens or even hundreds of smaller software services, each designed to perform a specific set of tasks, and that work together to provide the content streaming service. Doing so has several pronounced advantages. For instance, it can be easier to compartmentalize the development of the software application, as each standalone service can be assigned to a small group of programmers for implementation. This helps to alleviate complicated merge operations and troubleshooting operations during the development process, as each standalone service can be compiled and tested individually. Additionally, doing so greatly improves the modularity of the software solution, allowing individual services to be easily removed and replaced with updated services that perform the same task. As yet another advantage, such a modularized design allows the software solution to be easily distributed and redistributed over multiple different compute nodes (either physical or virtual), based on how the different services are positioned and configured.

However, there are drawbacks to such a modularized design as well. For instance, it can potentially be difficult to pinpoint the root cause of a problem in a heavily distributed software solution. For example, consider a solution made up of several hundred interconnected services. In such an environment, a problem occurring in one of the services may adversely affect the performance of several other services, which in turn may adversely affect the performance of still other services. When this occurs, the developers and engineers may have difficulty pinpointing which of the many malfunctioning services originally caused the problem. As another example, when a particular service begins consuming a large amount of system resources, it may be difficult to determine whether an update to the particular service is causing the heavy resource usage, or whether an update to another one of the services is causing the heavy resource usage.

Additionally, the vast majority of software applications go through a number of different iterations during their lifespan. For instance, a newer version of a software application could add a new feature to the software application. As another example, the newer version could attempt to resolve a problem with the previous version of the software application. As a practical matter, newer versions of software typically include a multitude of different changes and new features. Furthermore, the newer version of software may frequently be developed by a substantial number of developers, with one or more developers working on each of the changes and new features, and then merging their individual contributions into a single release version of the software.

However, since software development is not a perfect science, the newer version of software may introduce new problems as well. Such problems could be caused by any number of factors, including incompatible code introduced during the merge process, mistakes during the merge process, or simply errors in the code. While these problems could cause the new version of software to fail during execution, in other situations these problems could affect the performance of the software application (e.g., resulting in higher memory and CPU usage during execution), and thus may be harder to detect during quality assurance testing. In an environment in which a number of interrelated services are executing and in which the performance of a particular service can be influenced not only by the particular service's personal workload, but by the performance and workload of other services as well, it can be significantly harder to detect minor differences in the performance of a newer version of one of the services.

SUMMARY OF THE INVENTION

Embodiments provide a method for evaluating a second version of software. The method includes selectively routing incoming requests to software instances within a plurality of software instances. Here, the plurality of software instances comprises a plurality of baseline instances and a plurality of canary instances. Additionally, the plurality of baseline instances are running a first version of the software, and the plurality of canary instances are running the second version of the software. The method also includes monitoring the plurality of software instances to collect performance data for a plurality of performance metrics. Additionally, the method includes calculating a plurality of aggregate baseline performance metrics, wherein each of the plurality of aggregate baseline performance metrics corresponds to one of the plurality of performance metrics. Here, each of the plurality of aggregate baseline performance metrics is calculated based on the collected performance data for the plurality of baseline instances, relating to a corresponding one of the plurality of performance metrics. The method further includes, for each of the plurality of performance metrics and for each of the plurality of canary instances, calculating a relative performance value that measures the collected performance data for the respective canary instance and for the respective performance metric, relative to the corresponding aggregate baseline performance metric from the plurality of aggregate baseline performance metrics. Also, the method includes calculating a final overall measure of performance for the second version of software, based on the relative performance values.

Other embodiments include, without limitation, a non-transitory computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
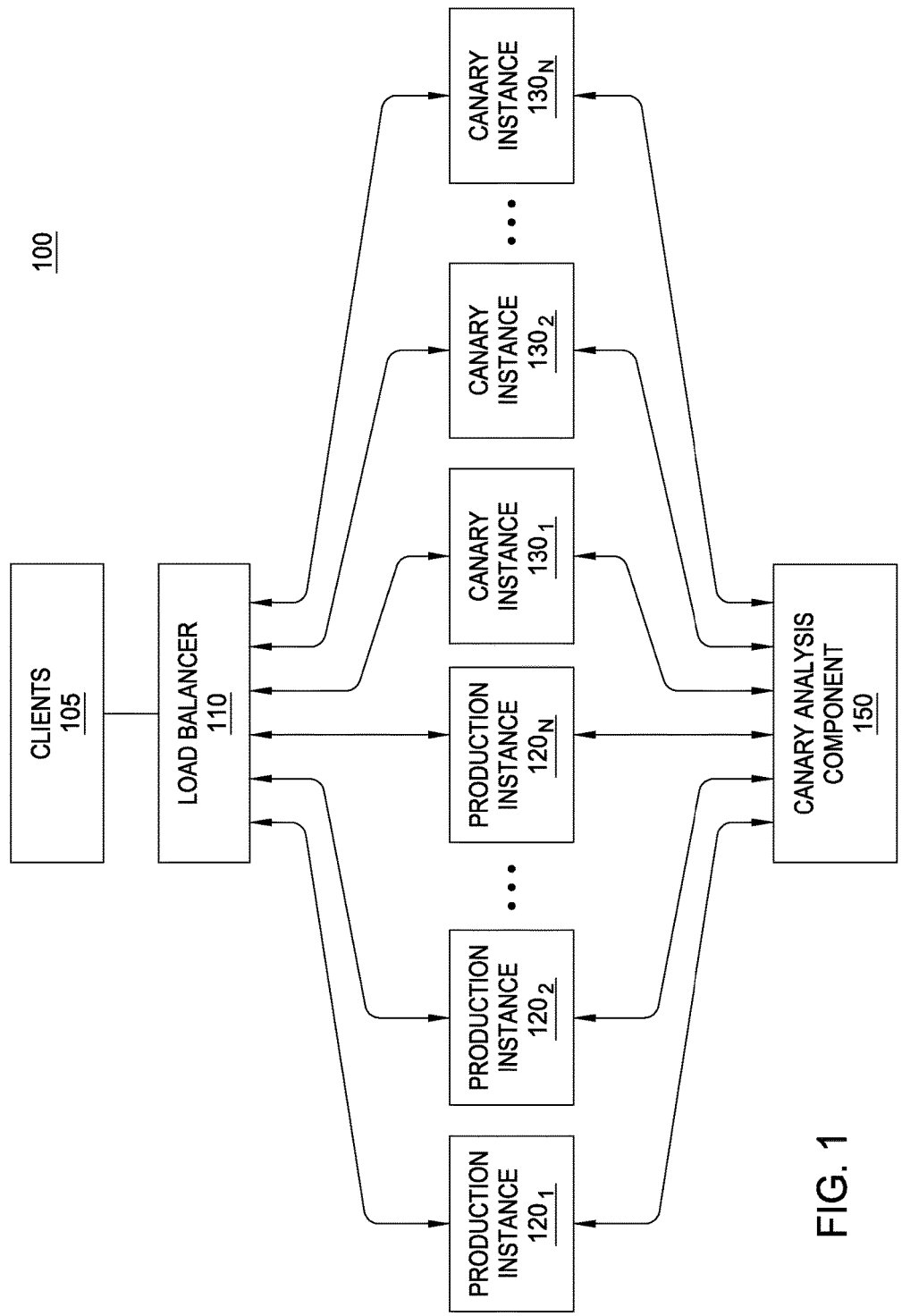
FIG. 1 illustrates a canary analysis environment configured with a canary analysis component, according to one embodiment described herein.

Although there are numerous advantages to a modularized computing environment, in which a multitude of different services are each designated a specific task or set of tasks, such an environment also introduces several challenges as well. For example, in a computing environment including hundreds of services, each of which may be dependent upon the performance of one or more other services, it can be challenging to quickly diagnose the source(s) of a problem. As used herein, a particular service can be said to be dependent upon another service, when the particular service's performance can be affected by the performance of the other service. In such an environment, when a single service begins to malfunction, the malfunctioning service can impact the performance of other services (e.g., services which depend upon the single service), which in turn can affect the performance of still other services, and so on. As a result, it can be difficult for an administrator to diagnose the root cause of a problem, when a number of different services begin malfunctioning.

Additionally, the efficiency of a single service's performance can vary depending on a number of different factors in such an environment. For example, a given service could consume more CPU resources and memory resources when its incoming workload increases (e.g., when more requests are routed to the service for processing). As another example, the service could begin consuming more CPU and memory resources, due to the behavior of another one of the services. For instance, a database service's workload could significantly increase, if another service begins erroneously submitting queries to the database service for process. As such, when testing a new version of a particular software service, it can be difficult to ascertain whether any variation in the new version's performance efficiency, relative to the previous version of the service, are in fact caused by the new version of the code (i.e., as opposed to the behavior of another service(s) or a fluctuation in the incoming workload of the service.

As such, embodiments provide techniques for evaluating a version of software. Embodiments may selectively route incoming requests to software instances within a plurality of software instances, where the plurality of software instances includes a baseline instances and canary instances. For purposes of this example, assume that the baseline instances are running a baseline version of the software and the canary instances are running the version of the software to be evaluated (that is distinct from the baseline version of the software). For instance, the baseline version could be the current version of the code that is used in a production environment, and the version to be evaluated could be a new version of the code that is scheduled for deployment in the production environment. More generally, however, it is broadly contemplated that any two instances of software that perform the same function may be compared using the techniques described herein.

Moreover, embodiments may be configured to route incoming requests to the software instances in a number of different ways. Generally, it is preferable that the incoming requests (and the workload from processing these requests) be evenly distributed across each of the plurality of software instances. In some embodiments, where each of the software instances has equal processing power and where each request requires approximately the same amount of processing power, a simple load balancing technique (e.g., round robin load balancing) may be employed. However, in other embodiments, particular requests may require significantly more (or less) processing, relative to other requests, and/or particular software instances may have significantly more (or less) processing power (e.g., due to the hardware on which the software instances are executing). As such, it is broadly contemplated that routing the incoming requests, embodiments may employ any number of different load balancing techniques in routing the incoming requests to the software instances. Examples of such techniques include, without limitation, round robin load balancing, weighted round robin load balancing, dynamic round robin load balancing, fastest load balancing, least connections load balancing, observed load balancing, and predictive load balancing. More generally, however, any technique (known or unknown) for evenly distributing the workload associated with processing the incoming requests across the plurality of software instances may be used, in accordance with the functionality described herein.

Additionally, embodiments may monitor the plurality of software instances to collect performance data for a plurality of performance metrics. For instance, a respective monitoring agent could be deployed for each of the plurality of software instances. The monitoring agents could collect performance data for the respective software instance and could report this performance data to a canary analysis component. Examples of the performance metrics include, without limitation, CPU usage, memory usage, network usage, latency, transaction rate, error rate, and so on. More generally, the performance metrics may include any measure of any sort of performance that is related to at least one of the software instances.

Embodiments may then calculate a plurality of aggregate baseline performance metrics, where each of the plurality of aggregate baseline performance metrics corresponds to one of the plurality of performance metrics, and where each of the plurality of aggregate baseline performance metrics is calculated based on collected performance data for the plurality of baseline instances, relating to a corresponding one of the plurality of performance metrics. As an example, embodiments could calculate an aggregate measure of CPU usage across all of the baseline instances by calculating an average of the CPU usage metrics collected for the baseline instances, and could calculate a similar aggregate measure for each of the other performance metrics measured.

Additionally, for each of the plurality of performance metrics and for each of the plurality of canary instances, embodiments may calculate a relative performance value that measures the collected performance data for the respective canary instance and for the respective performance metric, relative to the corresponding aggregate baseline performance metric from the plurality of aggregate baseline performance metrics. For instance, embodiments could compare the CPU usage metric for one of the canary instances against the aggregate CPU usage metric calculated for the plurality of baseline instances, and could calculate a relative performance value for the canary instance using these values. For instance, embodiments could divide the canary's average CPU usage metric by the baseline instances' aggregate average CPU usage metric, to produce a canary-to-baseline ratio with respect to the average CPU usage metric. Embodiments could also compute an expected lower bound and upper bound of the canary-to-baseline ratio, based on the measured statistics of the baseline aggregate average CPU usage metric and the canary instance average CPU usage metric.

Embodiments may then calculate a final measure of performance for the version of software being evaluated (i.e., the version of software running on the canary instances), based on the relative performance values. For instance, embodiments could calculate an aggregate relative performance value for each of the plurality of performance metrics. As an example, embodiments could calculate each of the aggregate relative performance values by calculating an average of the relative performance values for the respective performance metric. Embodiments could then calculate the final measure of performance, based on the aggregate relative performance values (e.g., by calculating an average of the aggregate relative performance values). Advantageously, doing so provides a relative comparison of the evaluated version of software to the baseline version of software. For example, embodiments could measure an average variance across all the performance metrics for the evaluated version of software, relative to the metrics for the baseline version, and could calculate a single number expressing a measure of confidence that the canary instances are healthy (e.g., a confidence measure of 85%), which can then be compared to a threshold measure of confidence to determine an overall acceptability for the canary software build.

Moreover, in particular embodiments, the final measure of performance can be calculated in various ways, in order to evaluate different performance aspects of the software versions. For example, a weighted average could be used in which particular performance metrics are given more (or less) weight. In one embodiment, certain metrics may be inverted when the final measure of performance is calculated. For example, a higher measured value for a particular performance metric, relative to a lower measured value for the particular performance metric, may be indicative of more efficient performance by the software (e.g., a metric such as incoming requests processed per second). At the same time, a higher measured value for another performance metric may be indicative of less efficient performance by the software (e.g., CPU usage, memory usage, etc.). As such, in one embodiment, the final measure of performance is calculated where a higher final measure of performance is indicative of more efficiently executing software, and in such an embodiment, measured values certain performance metrics could be inverted (e.g., metrics where a lower measured value is indicative of more efficient performance) in calculating the final measure of performance.

FIG. 1 illustrates a canary analysis environment configured with a canary analysis component, according to one embodiment described herein. As shown, the system 100 includes a plurality of clients 105, a load balancer component 110, a plurality of production instances $120_{1-N}$, a plurality of canary instances $130_{1-N}$, and a canary analysis component 150. For purposes of this example, assume that the production instances $120_{1-N}$ are running a baseline version (e.g., a production version) of a software application and the canary instances $130_{1-N}$ are running a new version of the software application. Generally, the clients 105 may submit requests for processing, and the load balancer 110 could distribute the incoming requests between the software instances $120_{1-N}$ and $130_{1-N}$ for processing. For instance, load balancer component 110 could selectively route incoming requests to software instances $120_{1-N}$ and $130_{1-N}$, according to a particular load balancing algorithm. Additionally, to minimize any potential disruption to the plurality of clients 105, the number of production instances $120_{1-N}$ may be much larger than the number of canary instances $130_{1-N}$. In such an environment, a majority of client requests could be routed to the production instances $120_{1-N}$, thereby insuring that any disruption caused by the canary instances $130_{1-N}$ affects only a minority of the client requests. In one embodiment, the system 100 represents an online content streaming service, in which a plurality of client devices 105 submit requests for streaming video content and these requests are fulfilled (at least in part) by the software instances $120_{1-N}$ and $130_{1-N}$. More generally, however, it is contemplated that the canary analysis component 150 may be configured for use in any type of environment, consistent with the functionality described herein.

In one embodiment, if the load balancer component 110 submits a request to one of the instances $120_{1-N}$ and $130_{1-N}$ and the request is not processed within a predetermined amount of time, the load balancer component 110 could be configured to resubmit the request to a different one of the instances $120_{1-N}$ and $130_{1-N}$. Advantageously, doing so allows for instances running the new version of the software application to be deployed within a production environment, while minimizing any impact on the clients 105. That is, if one of the canary instances $130_{1-N}$ running the new version of software experiences a problem in processing a request (e.g., due to a bug in the new version of software) which prevents the request from being processed within the predetermined amount of time, the load balancer 110 could resubmit the request to one of the production instances $120_{1-N}$ for processing.

Additionally, the canary analysis component 150 could monitor the software instances $120_{1-N}$ and $130_{1-N}$ to collect performance data relating to a plurality of performance metrics. For instance, a respective monitoring component(s) (not shown) could be deployed for each of the instances $120_{1-N}$ and $130_{1-N}$, and these monitoring components could collect performance data for their respective software instance and transmit the collected performance data to the canary analysis component 150 (e.g., via a communications network). The canary analysis component 150 could then calculate aggregate baseline performance metrics based on the production instances $120_{1-N}$, where each of the aggregate baseline performance metrics is calculated based on performance data collected from the plurality of production instances $120_{1-N}$, for a given one of the performance metrics. As an example, the canary analysis component 150 could calculate average value across the production instances $120_{1-N}$, for each of the performance metrics being measured.

Additionally, for each of the performance metrics and canary instances, the canary analysis component 150 could calculate a relative performance value that measures the collected performance data for the respective canary instance and for the respective performance metric, relative to the corresponding aggregate baseline performance metric. For example, the canary analysis component 150 could calculate a particular canary instance's relative performance value for an average CPU usage metric, by calculating the ratio between the particular canary instance's average CPU usage metric and the aggregate baseline performance metric for average CPU usage. The canary analysis component 150 could then calculate a similar relative performance value for the canary instance, for each of the other performance metrics, and could then calculate similar relative performance values for the other canary instances.

The canary analysis component 150 could then calculate a final measure of performance for the version of software being evaluated (i.e., the version of software running on the canary instances), based on the relative performance values. For instance, the canary analysis component 150 could calculate an aggregate relative canary performance value for each of the plurality of performance metrics being measured, based on the relative performance values for the canary instances $130_{1-N}$. For instance, to determine the aggregate relative canary performance value for a given one of the performance metrics, the canary analysis component 150 could calculate an average of the relative performance values relating to the given performance metric. The canary analysis component 150 could then determine the final measure of performance for the version of software being evaluated, based on the aggregate relative canary performance values. For instance, the canary analysis component 150 could determine the final performance measure by calculating an average of the aggregate relative canary performance values. Advantageously, doing so provides a measure of the variability between the performance metrics for the version of software running on the canary instances $130_{1-N}$, relative to the performance metrics for the baseline version of software running on the production instance $120_{1-N}$. Such a value could then be used to determine whether the new version of the software has affected the software's performance.

Figure 2:
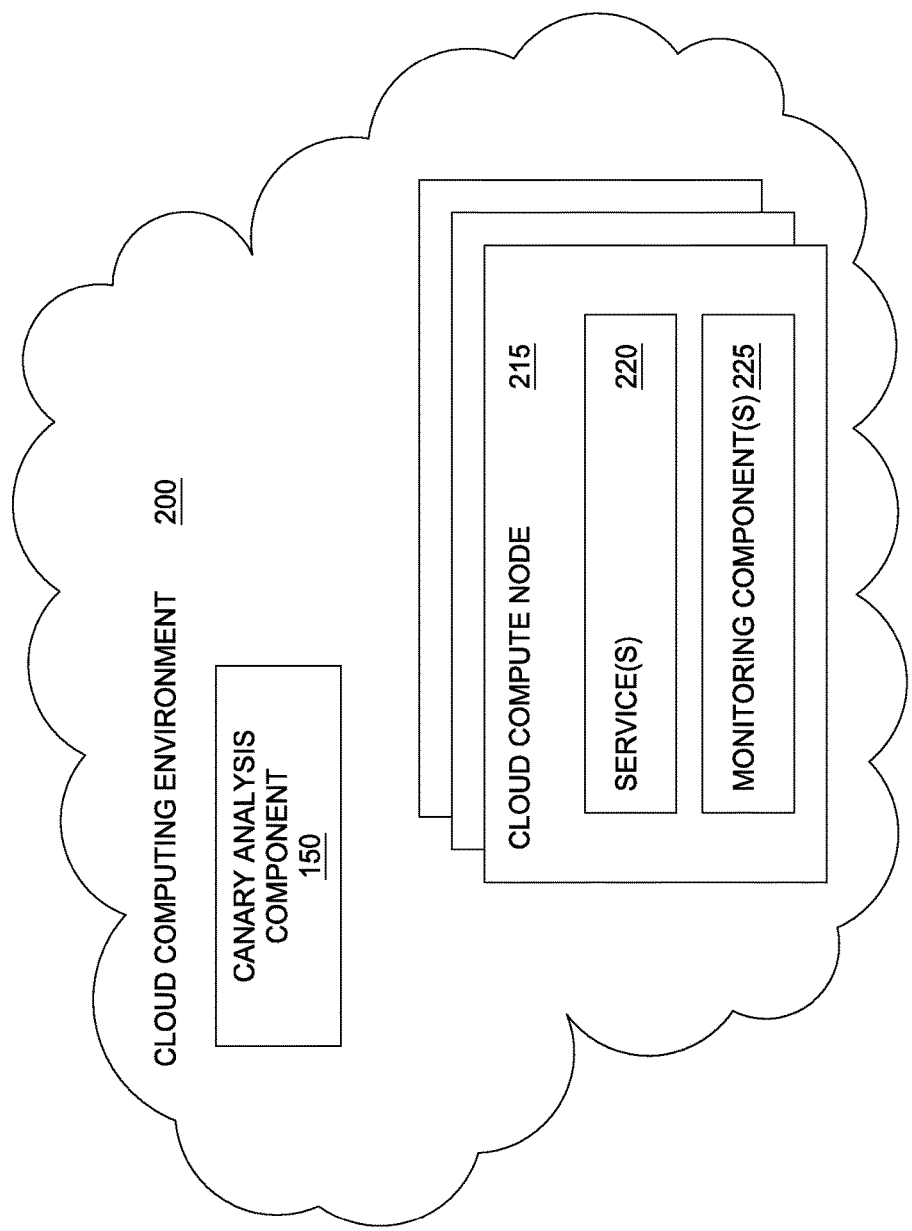
FIG. 2 illustrates a cloud computing environment configured with a canary analysis component, according to one embodiment described herein.

In one embodiment, the canary analysis component 150 is configured to operate within a cloud computing environment. FIG. 2 illustrates a cloud computing environment configured with a canary analysis component, according to one embodiment described herein. As shown, the cloud computing environment 200 includes the canary analysis component 150 and a plurality of cloud compute nodes 215. The cloud compute nodes 215 each contain a respective one or more services 220 and a respective one or more monitoring components 225. Generally, each of the monitoring components 225 can be configured to monitor a corresponding one of the service 220 in order to collect performance data pertaining to a plurality of performance metrics for a corresponding one of the services 220. In one embodiment, the monitoring components 225 are configured to transmit the collected performance data to the canary analysis component 150 (e.g., via a local area network within the cloud computing environment 200). In a particular embodiment, the monitoring components 225 are configured to store the collected performance data (e.g., in a database), and the canary analysis component 150 is configured to retrieve the stored performance data (e.g., by querying the database).

The canary analysis component 150 may also be configured to filter out certain performance data when calculating a final measure of performance for a version of software. For example, if one of the monitoring components 225 reports performance data to the canary analysis component 150 that has an excessively high variance (e.g., a measure of variance that exceeds a predefined threshold level of variance), the canary analysis component 150 could label this data as noisy and could exclude it from consideration in calculating the final measure of performance. As another example, if one of the monitoring components 225 reports an error message to the canary analysis component 150 in lieu of or in addition to the performance data, the canary analysis component 150 could be configured to exclude the performance data from consideration in calculating the final measure of performance. As yet another example, if one of the monitoring components does not report a sufficient amount of data to the canary analysis component 150 (e.g., when the number of reported data points failed to exceed a predefined minimum number of data points), the canary analysis component 150 could exclude this data from consideration. More generally, it is broadly contemplated that the canary analysis component 150 may exclude any performance data that is determined to be questionable and/or insufficient for consideration in calculating the final measure of performance for a particular version of software. In one embodiment, the canary analysis component 150 is configured to impose requirements that a certain number of performance metrics be valid, before calculating the final measure of performance for the canary instances.

Figure 3:
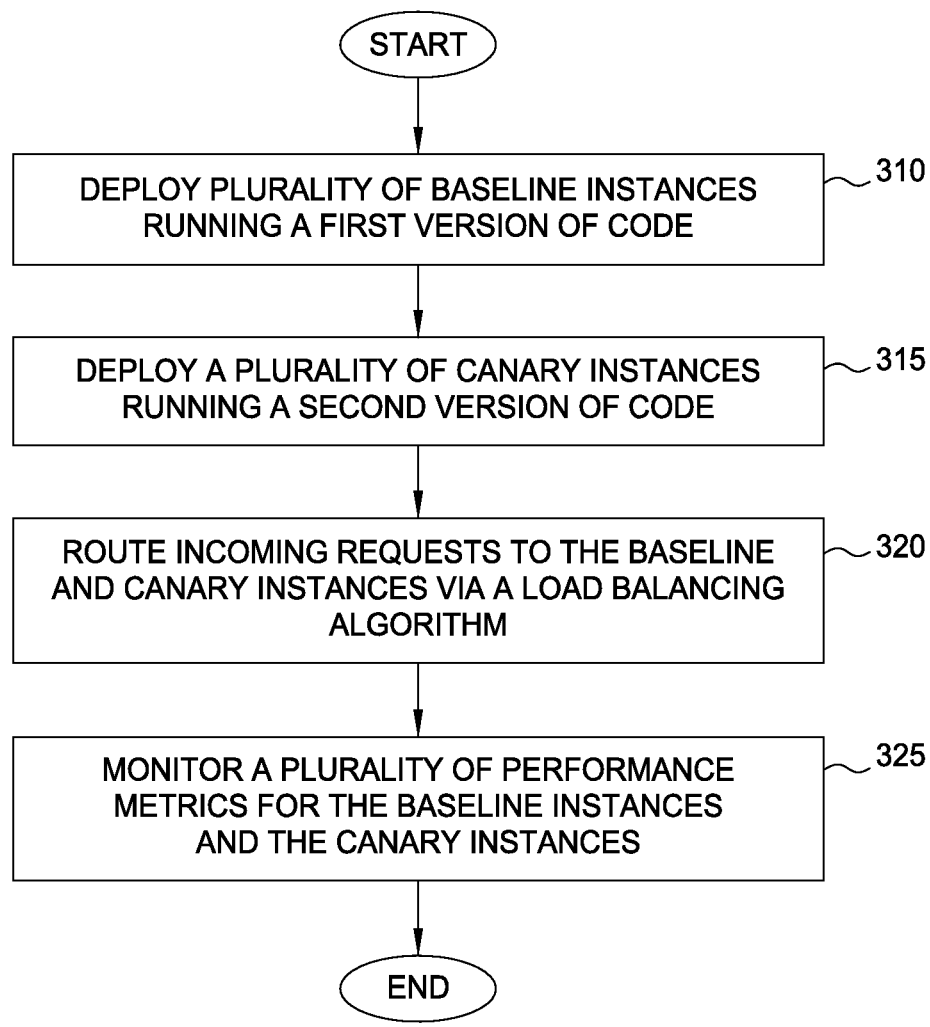
FIG. 3 is a flow diagram illustrating a method for collecting performance data in a canary analysis environment, according to one embodiment described herein.

FIG. 3 is a flow diagram illustrating a method for collecting performance data in a canary analysis environment, according to one embodiment described herein. As shown, the method 300 begins at block 310, where baseline instances running a first version of code are deployed. Canary instances running a second version of code are also deployed (block 315). For instance, the baseline instances and canary instances could be deployed by a user (e.g., an engineer or developer). In one embodiment, the canary analysis component 150 is configured to automatically deploy the canary and baseline instances for testing.

Additionally, a load balancer component is configured to selectively route incoming requests to the baseline and canary instances, via a load balancing algorithm (block 320). As discussed above, any algorithm for evenly balancing incoming traffic between the deployed software instances may be used, in accordance with the functionality described herein. Examples of such load balancing algorithms include, without limitation, round robin load balancing, weighted round robin load balancing, dynamic round robin load balancing, and so on. Advantageously, by distributing incoming traffic and the accompanying workload as evenly as possible between the baseline and canary instances, embodiments help to ensure an accurate comparison between the first version of software running on the baseline instances and the second version of software running on the canary instances. In one embodiment, the canary analysis component 150 is configured to direct more traffic toward the canary instance, and less traffic towards the baseline instances, in order to evaluate how the canary instances perform under extra load. Such a test may be referred to as a "squeeze test." In such a squeeze test, the canary analysis component 150 can monitor the plurality of performance metrics for the canary instances, in order to verify that the overall health and performance of the canary instances does not degrade unexpectedly with increasing load.

The canary analysis component 150 also monitors a plurality of performance metrics across the plurality of baseline instances and the plurality of canary instances (block 325), and the method 300 ends. Generally, the performance metrics may be any quantifiable measure relating to the performance of a software application. Examples include, without limitation, measures of CPU usage, memory usage, latency, and so on. As discussed above, in one embodiment, a respective monitoring component is provisioned for each of the plurality of canary instances and for each of the plurality of baseline instances. These monitoring components could be configured to collect data relating to the performance metrics being measured and to report this data to the canary analysis component 150.

Figure 4:
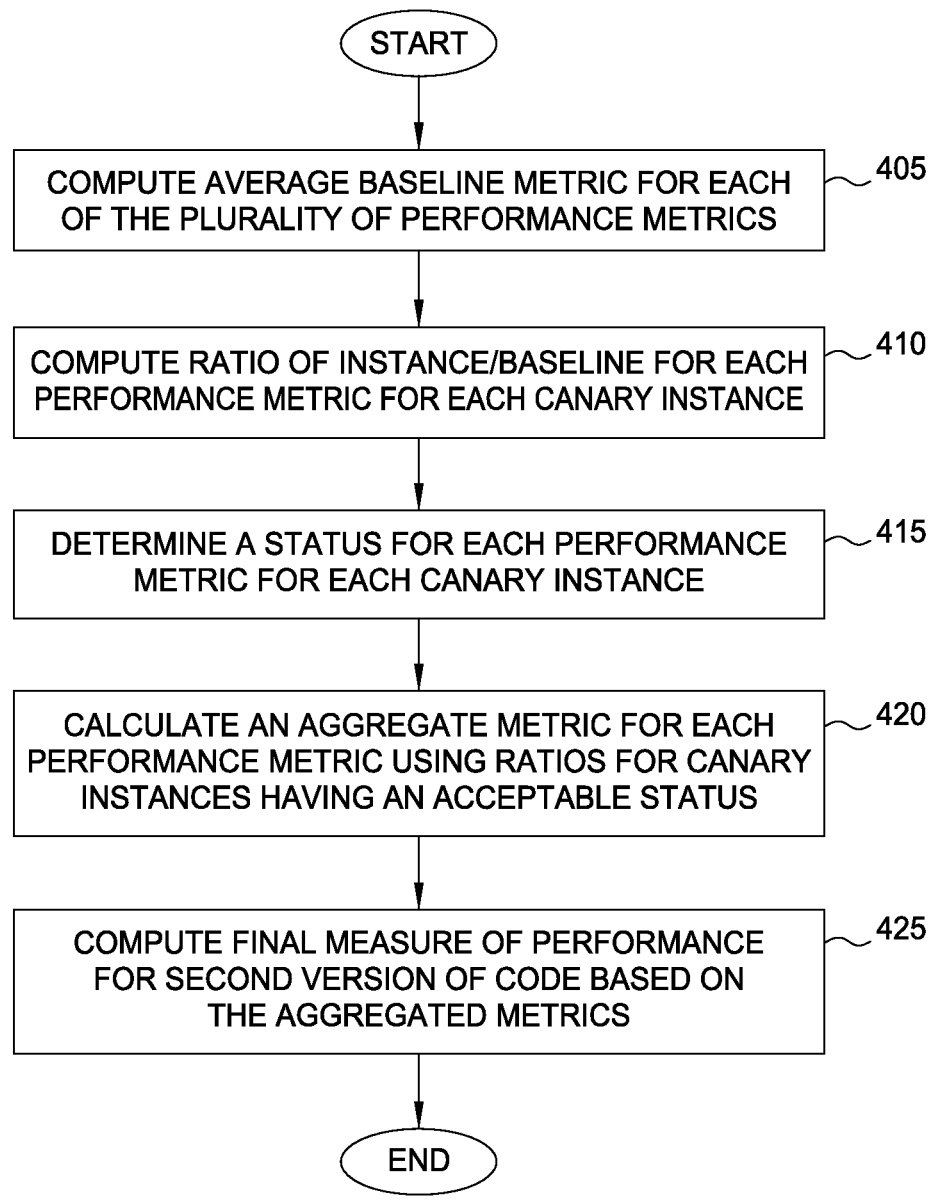
FIG. 4 is a flow diagram illustrating a method for computing canary analysis results, according to one embodiment described herein.

FIG. 4 is a flow diagram illustrating a method for computing canary analysis results, according to one embodiment described herein. As shown, the method 400 begins at block 405, where the canary analysis component 150 computes an average baseline metric for each of the plurality of performance metrics. For example, for a CPU usage metric, the canary analysis component 150 could calculate the average of the CPU metrics measured across all of the baseline instances. The canary analysis component 150 could then calculate a similar average baseline metric for each of the other performance metrics being measured (e.g., memory usage, latency, etc.).

Once the average baseline metrics are calculated, the canary analysis component 150 calculates, for each of the plurality of canary instances and for each of the performance metrics being measured, a measure of variance between the measured metric for the respective canary instance and the corresponding average baseline metric. In the depicted method 400, the canary analysis component 150 calculates the ratio of the measured metric for the respective canary instance to the corresponding average baseline metric. For example, if the canary analysis component 150 determines that the CPU usage metric for the respective canary instance is 40% and the average baseline CPU usage metric is 45%, the canary analysis component 150 could determine that the ratio is 0.89 (i.e., 0.40/0.45). Of course, the determination of such a ratio is but one example of the measure of variance, and it is broadly contemplated that any measure of variance between the measured performance metric for the respective canary instance and the corresponding average baseline metric may be used.

Additionally, in the depicted example, the canary analysis component 150 determines a status for each of the measured metrics for each of the canary instances (block 415). For example, if the variance of a portion of the performance data measured for a given performance metric and a given canary instance exceeds a predetermined threshold level of variance, the canary analysis component 150 could determine that the portion of performance data is excessively noisy and should be excluded from consideration in computing the final measure of performance. As another example, the canary analysis component 150 could determine that an insufficient amount of performance data had been collected for a particular one of the canary instances with respect to a particular one of the measured performance metrics, and accordingly could determine that this performance data should also be excluded from consideration.

The canary analysis component 150 then calculates an aggregate metric for each of the measured performance metrics, using the calculated measures of variance between the data collected for the canary instances and the aggregate baseline metrics (block 420). For instance, in block 410, the canary analysis component 150 could have calculated a measure of variance in the CPU usage metric for each of the canary instances. In calculating the aggregate metric for CPU usage, the canary analysis component 150 could calculate the average of the measures of variance in the CPU usage metric across the canary instances having an acceptable status (e.g., excluding metrics having a noisy, insufficient or error status).

The canary analysis component 150 then calculates a final measure of performance for the version of software running on the canary instances, based on the aggregated metrics (block 425). In one embodiment, the canary analysis component 150 is configured to calculate the final measure of performance by computing an average of the aggregate metric values across all of the measured performance metrics. In a particular embodiment, the canary analysis component 150 computes the final measure of performance using a weighted average, where the aggregate metric relating to a certain one of the performance metrics is given a greater weight than the aggregate metric for another one of the performance metrics. More generally, any algorithm or technique for calculated the final measure of performance based on the aggregated metric values can be used, in accordance with the functionality described herein. Once the final measure of performance is calculated, the method 400 ends.

Figure 5:
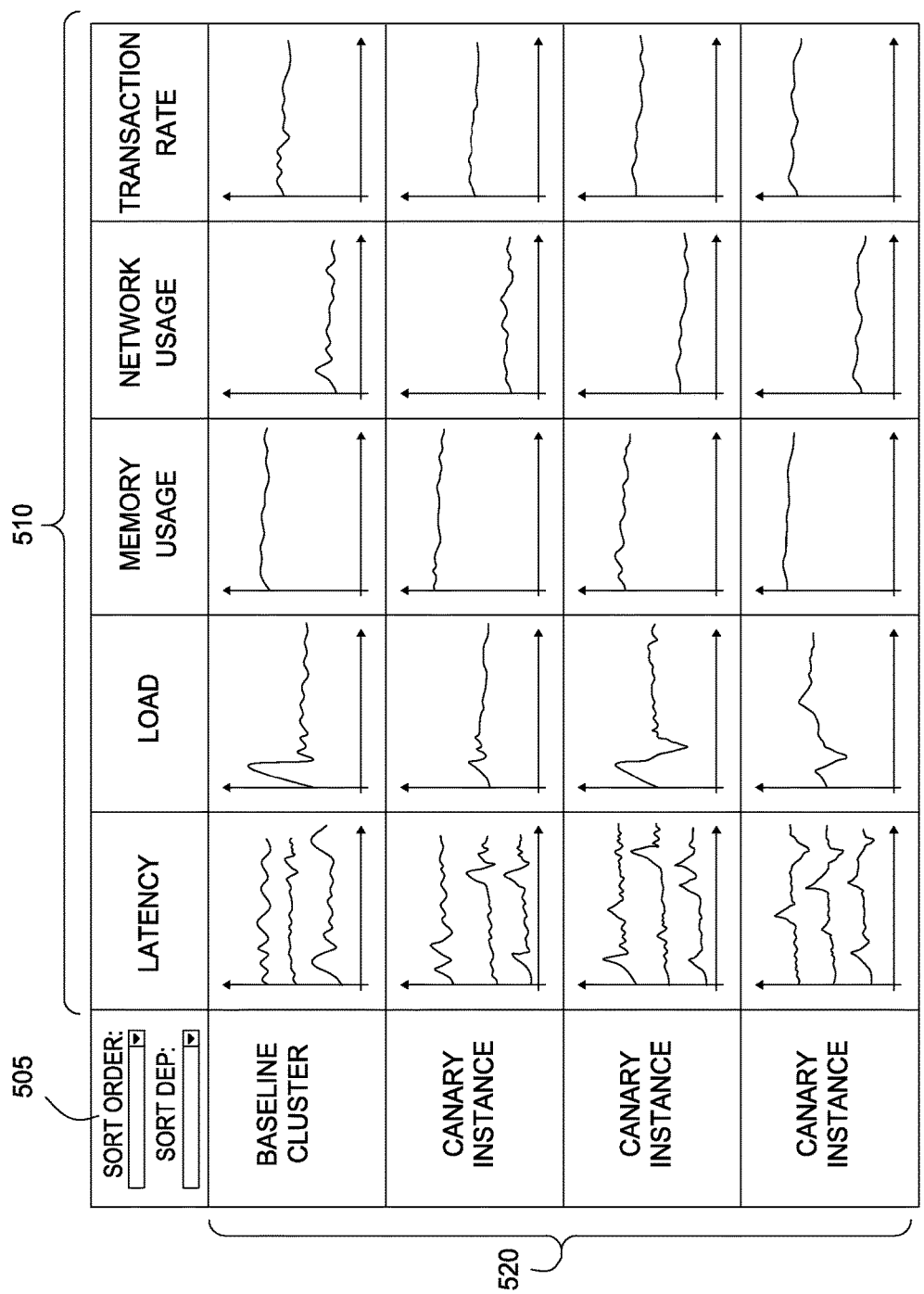
FIG. 5 illustrates an interface for displaying performance data relating to a canary analysis, according to one embodiment described herein.

FIG. 5 illustrates an interface for displaying performance data relating to a canary analysis, according to one embodiment described herein. As shown, the interface 500 includes a plurality of performance metrics 510, a plurality of rows 520 and sorting buttons 505. Generally, the sorting buttons 505 can be used to alter the order in which the rows 520 are presented in the interface 500. As shown, the performance metrics being measured in the depicted embodiment include measures of latency, load, memory usage, network usage and transaction rate. While only a relatively small number of performance metrics are shown in the interface 500, the value of automated canary analysis becomes even more apparent when hundreds of performance metrics are monitored and evaluated across a substantial number of software instances. Of note, the depicted embodiment includes multiple different measures of latency for each of the rows, which are displayed within a single graph. Examples of different measures of latency include, for example, measures of latency to distinct sub-parts within a software instance and different types of types of measures of latency (e.g., roundtrip latency, endpoint computational speed, traceroutes, etc.).

Each of the rows 520 represents a respective one or more software instances. In one embodiment, the rows 520 may represent aggregate performance metrics for clusters of instances. For example, in the depicted embodiment, the baseline software instances are represented using a single row, and the data depicted for the various metrics 510 in this row relates to the baseline instances as a whole. For example, the performance metrics 510 for the baseline cluster row could depict the average measured value across all of the baseline instances. The rows 520 also include several canary instances. While a single canary instance is shown per row in the depicted embodiment, it is contemplated that embodiments could group the canary instances into one or more clusters, and these clusters could be depicted on the rows 520 of the interface 500. Advantageously, by depicting the collected data in graphical form using the interface 500, embodiments can quickly and efficiently communicate the performance of the canary instances and the baseline instances to users.

Figure 6:
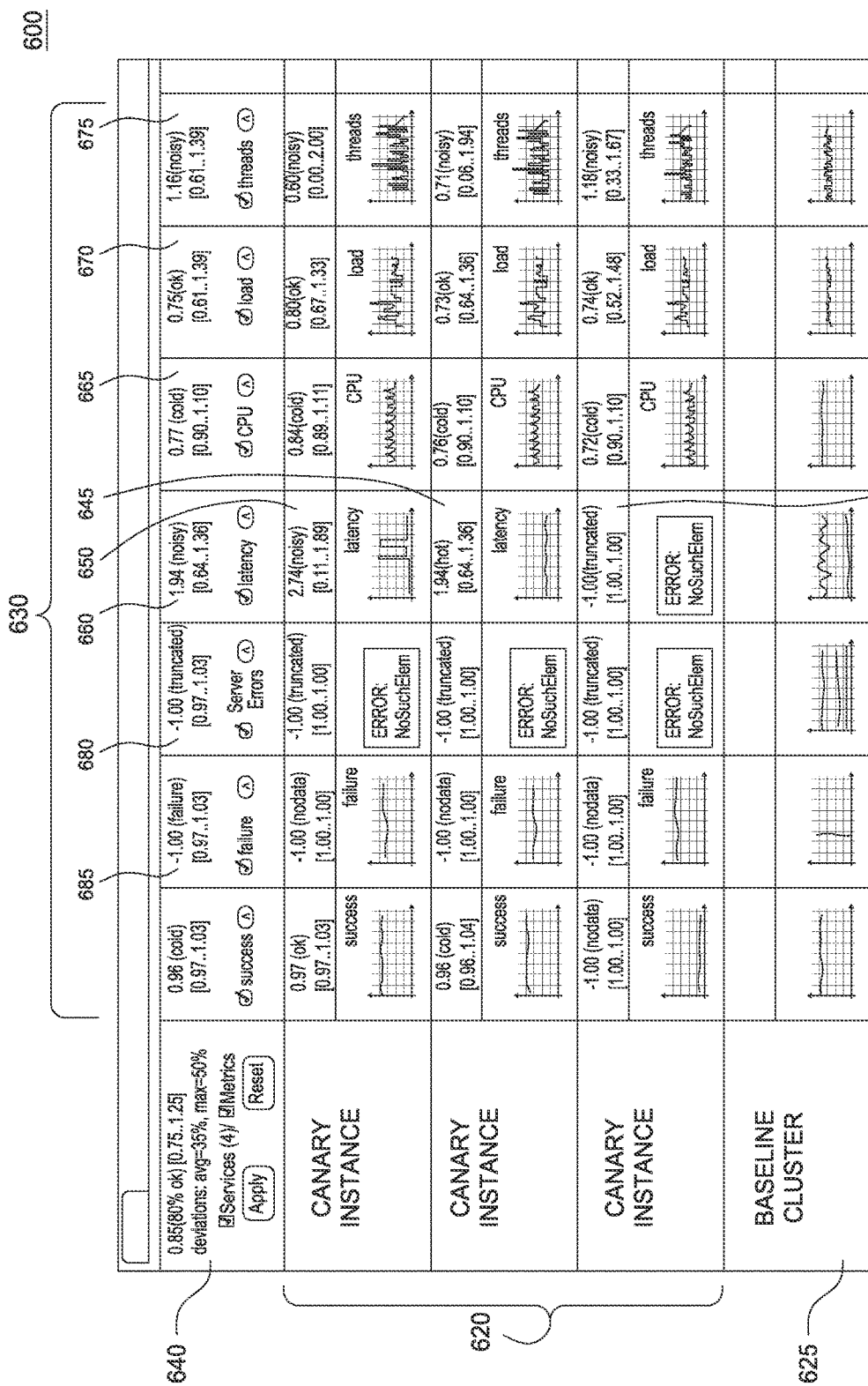
FIG. 6 illustrates an interface for displaying canary analysis results, including the handling of metric gathering errors occurring during analysis, according to one embodiment described herein.

FIG. 6 illustrates an interface for displaying canary analysis results, according to one embodiment described herein. As shown, the interface 600 includes a plurality of rows 620, each relating to a different canary software instance (or group of canary instances), and a plurality of columns 630, each relating to a different performance metric measured for the plurality of canary instances. Generally, the interface 600 is used to display not only the visual depictions of the performance data collected for the various canary instances, but also to display the results of the analysis of the version of software deployed on the canary instances.

For example, in the depicted example, the canary analysis component 150 has classified each of the measured performance metrics for each of the canary instances based on various quality criteria. In the depicted embodiment, these classifications include an "ok" classification (i.e., for an average metric value within an acceptable range, relative to the corresponding metric value for the cluster of baseline instances), a "cold" classification (i.e., for an average metric value that is significantly less than the corresponding metric value measured for the cluster of baseline instances), a "hot" classification (i.e., for an average metric value that is significantly greater than the corresponding metric value measured for the cluster of baseline instances), a "noisy" classification (i.e., for a metric with a significant amount of variance), a "nodata" classification (i.e., for a metric where no data was collected), and a "truncated" classification (i.e., for a metric where less data than would be expected was collected, e.g., when an instance has only been running for 10 minutes, while the time collection window is 1 hour). More generally, however, it is broadly contemplated that these classifications, a subset of these classifications, and numerous other classifications can be used, consistent with the functionality described herein.

For instance, as shown, canary analysis component 150 has assigned the latency metric 650 for the first canary instances a noisy classification due to an excessive amount of variance. That is, the canary analysis component 150 has calculated an expected range from 0.11 to 1.89 for this metric, and has determined that this amount of variance is significant enough to classify the metric as "noisy" (e.g., based on a determination that the amount of variance exceeds a predetermined threshold measure of variance).

Additionally, the canary analysis component 150 has calculated a relative value of 2.74 for the latency metric 650 for one specific canary instance. In one embodiment, the canary analysis component 150 is configured to calculate this value by dividing the average metric for the canary instance by the corresponding metric collected for the cluster of baseline instances. In another embodiment, the canary analysis component 150 is configured to calculate this value by dividing the corresponding metric collected for the cluster of baseline instances by the average metric for the canary instance. More generally, it is broadly contemplated that any number of different techniques could be used to calculate a value that measures the data collected for the canary instance, relative to the corresponding data collected for the cluster of baseline instances.

Additionally, in the depicted example, the canary analysis component 150 has determined that the latency metric 645 for the second canary instance has a relative value of 1.94 (i.e., relative to the latency metric collected for the cluster of baseline instances), and has classified the metric 645 as hot, due to the metric's 645 relative value significantly exceeding a value of 1.0 (e.g., exceeding the value of 1.0 by a threshold amount). Furthermore, the latency metric 655 for the third canary instance has been assigned a classification of truncated. In the depicted embodiment, the truncated classification represents a metric for which one or more error messages were returned from the monitor component, or for which much less data than would be expected was returned. As discussed above, the truncated classification is used in this embodiment to denote a metric for which at least one of the performance monitors associated with the corresponding canary instance encountered an error.

Once the canary analysis component 150 has classified each of the performance metrics for each of the canary instances, the canary analysis component 150 could then calculate an aggregate relative performance value for each of the measured performance metrics. Generally, the aggregate relative performance values reflect the value of the performance metric across all of the monitored canary instances. As shown, the interface 600 includes aggregate relative performance values 685, 680, 660, 665, 670 and 675. Additionally, the canary analysis component 150 could assign classifications to the aggregate relative performance values. For instance, in the depicted embodiment, the aggregate relative performance value 660 has been assigned a classification of nodata.

Once the aggregate relative performance values are calculated, the canary analysis component 150 could calculate the final measure of performance 640 for the version of software running on the canary instances. In the interface 600, the final measure of performance 640 is shown as a value of 0.85 and has been assigned a classification of "80% ok." In this embodiment, the "80% ok" classification represents the likelihood that 0.85 is close enough to 1.0 for the measured data to still be considered acceptable. In other words, in the present example, the canary analysis component 150 has determined that the aggregate of all the metrics for all of the canary instances are approximately 85% of the value of their corresponding counterpart metrics collected for the cluster of baseline instances, and that this is sufficiently close to 1.0 to have confidence that the canary instances are functioning properly. Advantageously, doing so enables a user to quickly see how differently the canary instances are performing, relative to the baseline instances.

In one embodiment, the canary analysis component 150 is configured to exclude performance metric data having a particular classification(s). For instance, the canary analysis component 150 could be configured to exclude performance data classified as truncated data when calculating the aggregate relative performance values. As another example, the canary analysis component 150 could be configured to exclude any aggregate relative performance values having a noisy classification in calculate the final measure of performance for the canary instances. Doing so allows the canary analysis component 150 to selectively exclude particular performance data when calculating the aggregate relative performance values and/or the final measure of performance for a given set of canary instances running a given version of software.

Figure 7:
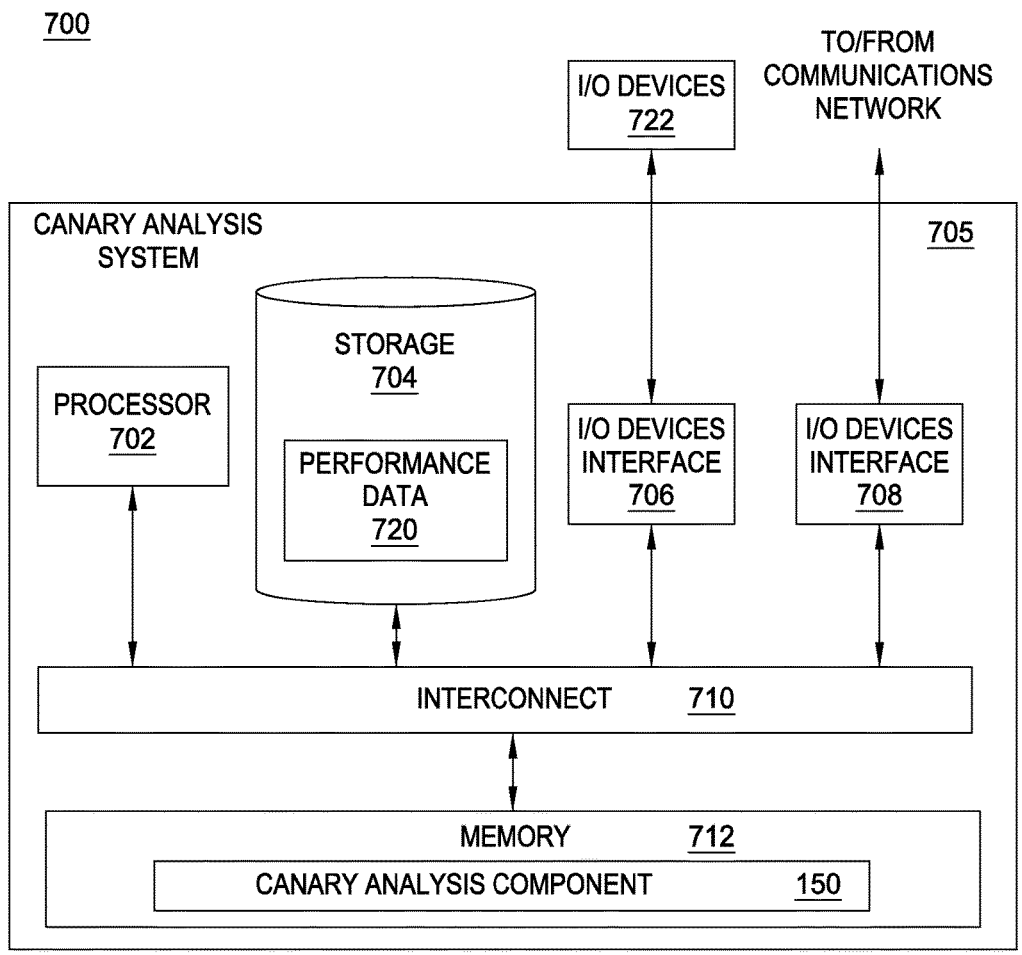
FIG. 7 illustrates a computing system configured with a canary analysis component, according to one embodiment described herein.

FIG. 7 illustrates a computing system configured with a canary analysis component, according to one embodiment described herein. As shown, the environment 700 includes a canary analysis system 705 which includes, without limitation, a central processing unit (CPU) 702, a network interface 708, an interconnect 710, and a system memory 712. The CPU 702 retrieves and executes programming instructions stored in the system memory 712. Similarly, the CPU 702 stores and retrieves application data residing in the system memory 712. The interconnect 710 facilitates transmission, such as of programming instructions and application data, between the CPU 702, input/output (I/O) devices interface 706, storage 704, network interface 708, and system memory 712. The I/O devices interface 706 is configured to receive input data from user I/O devices 722. Examples of user I/O devices 722 may include one of more buttons, a keyboard, and a mouse or other pointing device. The I/O device interface 706 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 702 is included to be representative of a single CPU, multiple CPUs, a single CPU having multiple processing cores, and the like. And the system memory 712 is generally included to be representative of a random access memory. The storage 704 may be a disk drive storage device. Although shown as a single unit, the storage 704 may be a combination of fixed and/or removable storage devices, such as fixed disc drives, floppy disc drives, tape drives, removable memory cards, or optical storage, network attached storage (NAS), or a storage area-network (SAN). The network interface 708 is configured to transmit data via the communications network, e.g., to transmit context tokens and localized digital assets from client devices as well as to return a assembled variation of digital content generated by the dynamic context-based assembler to the client devices.

The system memory 712 stores a canary analysis component 150 that is configured to evaluate a second version of software. As discussed above, the canary analysis component 150 or a load balancing component (not shown) could selectively route incoming requests to a plurality of baseline instances and a plurality of canary instances, where the baseline instances run a first software version and the canary instances run the second software version. The canary analysis component 150 could monitor the software instances to collect performance data for a plurality of performance metrics. Additionally, the canary analysis component 150 could calculate aggregate baseline performance metrics, where each of the aggregate baseline performance metrics is calculated based on collected performance data for the plurality of baseline instances. For each of the performance metrics and canary instances, the canary analysis component 150 could calculate a relative performance value that measures the collected performance data for the respective canary instance and for the respective performance metric, relative to the corresponding aggregate baseline performance metric. The canary analysis component 150 could then calculate a final measure of performance for the second version of software, based on the relative performance values.

Additionally, the embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a plurality of baseline instances and canary instances could be deployed within a cloud, and incoming requests could be routed to the baseline and canary instances (e.g., according to a load balancing algorithm). A canary analysis component 150 within the cloud computing environment could monitor the baseline and canary instances and could collect performance data for a number of different performance metrics. The canary analysis component 150 could then calculate an aggregate performance metric for the canary instances, which measures the performance of the canary instances relative to the baseline instances across the plurality of metrics. Doing so allows a user to efficiently analyze the performance for the canary instances from any computing system attached to a network connected to the cloud (e.g., the Internet).

In the preceding, reference is made to embodiments of the invention. However, it should be understood that the present disclosure is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A method for evaluating a second version of a software application program, comprising:

selectively routing, via a load balancing algorithm, incoming requests to a plurality of baseline software instances of the software application program executing on a plurality of hardware platforms and a plurality of canary software instances of the software application program also executing on the plurality of hardware platforms, wherein each of the plurality of baseline software instances comprises a first version of the software application program, each of the plurality of canary software instances comprises the second version of the software application program;

collecting, via one or more hardware processors, performance data for a plurality of performance metrics measuring a performance of one or more computing devices related to the plurality of baseline software instances executing on the plurality of hardware platforms;

collecting, via the one or more hardware processors, performance data for the plurality of performance metrics measuring a performance of one or more other computing devices related to the plurality of canary software instances executing on the plurality of hardware platforms;

for each of the plurality of performance metrics:

calculating, via the one or more hardware processors, an aggregate baseline performance metric for the performance metric by averaging the performance data measuring the performance of the one or more computing devices related to the plurality of baseline software instances; and calculating, via the one or more hardware processors, a performance value for each canary software instance included in the plurality of canary software instances by calculating a difference between the aggregate baseline performance metric for the performance metric and the performance data measuring the performance of the one or more other computing devices related to a corresponding canary software instance; and calculating, via the one or more hardware processors, a final measure of performance for the second version of the software application program by at least one of:

calculating an average of the performance values calculated for the canary software instances included in the plurality of canary software instances;

calculating one or more variances of the performance data for one or more of the canary software instances included in the plurality of canary software instances relative to one or more of the aggregate baseline performance metrics calculated for the plurality of baseline software instances; and calculating an average variance of the performance data for the canary software instances included in the plurality of canary software instances relative to the aggregate baseline performance metrics calculated for the plurality of baseline software instances.

2. The method of claim 1, further comprising:

determining that a portion of performance data relating to one of the plurality of performance metrics for one of the plurality of canary software instances fails to satisfy one or more quality criteria; and excluding the portion of performance data when calculating the final measure of performance for the second version of the software application program, whereby the portion of performance data is not considered in calculating the final measure of performance.

3. The method of claim 2, wherein the one or more quality criteria include at least one of (i) a threshold amount of variance, (ii) one or more error messages relating to the collected performance data, and (iii) a lack of performance data.

4. The method of claim 1, wherein monitoring the plurality of baseline software instances and the plurality of canary software instances to collect performance data comprises:

deploying a different monitoring agent for each of the plurality of baseline software instances and each of the plurality of canary software instances, wherein each of the monitoring agents is configured to collect performance data relating to the plurality of performance metrics; and receiving the performance data collected by at least one of the monitoring agents.

5. The method of claim 1, further comprising:

determining that a first incoming request routed to a first canary software instance included in the plurality of canary software instances is not processed within a predetermined amount of time; and in response to the determining, rerouting the first incoming request to a first baseline software instance included in the plurality of baseline software instances.

6. The method of claim 1, further comprising:

detecting an error experienced by a first incoming request routed to a first canary software instance included in the plurality of canary software instances; and in response to the detecting, rerouting the first incoming request to a first baseline software instance included in the plurality of baseline software instances.

7. A non-transitory computer-readable medium containing a program that, when executed by one or more hardware processors, performs an operation for evaluating a second version of a software application program, the operation comprising:

selectively routing, via a load balancing algorithm, incoming requests to a plurality of baseline software instances of the software application program executing on a plurality of hardware platforms and a plurality of canary software instances of the software application program also executing on the plurality of hardware platforms, wherein each of the plurality of baseline software instances comprises a first version of the software application program, each of the plurality of canary software instances comprises the second version of the software application program;

collecting, via the one or more hardware processors, performance data for a plurality of performance metrics measuring a performance of one or more computing devices related to the plurality of baseline software instances executing on the plurality of hardware platforms;

collecting, via the one or more hardware processors, performance data for the plurality of performance metrics measuring a performance of one or more other computing devices related to the plurality of canary software instances executing on the plurality of hardware platforms;

for each of the plurality of performance metrics:
  calculating, via the one or more hardware processors, an aggregate baseline performance metric for the performance metric by averaging the performance data measuring the performance of the one or more computing devices related to the plurality of baseline software instances; and
  calculating, via the one or more hardware processors, a performance value for each canary software instance included in the plurality of canary software instances by calculating a difference between the aggregate baseline performance metric for the performance metric and the performance data measuring the performance of the one or more other computing devices related to a corresponding canary software instance; and
calculating, via the one or more hardware processors, a final measure of performance for the second version of the software application program by at least one of:
  calculating an average of the performance values calculated for the canary software instances included in the plurality of canary software instances;
  calculating one or more variances of the performance data for one or more of the canary software instances included in the plurality of canary software instances relative to one or more of the aggregate baseline performance metrics calculated for the plurality of baseline software instances; and
  calculating an average variance of the performance data for the canary software instances included in the plurality of canary software instances relative to the aggregate baseline performance metrics calculated for the plurality of baseline software instances.

8. The non-transitory computer-readable medium of claim 7, the operation further comprising:
  determining that a portion of performance data relating to one of the plurality of performance metrics for one of the plurality of canary software instances fails to satisfy one or more quality criteria; and
  excluding the portion of performance data when calculating the final measure of performance for the second version of the software application program, whereby the portion of performance data is not considered in calculating the final measure of performance.

9. The non-transitory computer-readable medium of claim 8, wherein the one or more quality criteria include at least one of (i) a threshold amount of variance, (ii) one or more error messages relating to the collected performance data, and (iii) a lack of performance data.

10. The non-transitory computer-readable medium of claim 7, wherein monitoring the plurality of baseline software instances and the plurality of canary software instances to collect performance data comprises:
  deploying a different monitoring agent for each of the plurality of baseline software instances and each of the plurality of canary software instances, wherein each of the monitoring agents is configured to collect performance data relating to the plurality of performance metrics; and
  receiving the performance data collected by at least one of the monitoring agents.

11. A canary analysis system, comprising:
a memory storing a canary analysis component; and
a hardware processor coupled to the memory, wherein, when executed by the hardware processor, the canary analysis component configures the hardware processor to:
  selectively route, via a load balancing algorithm, incoming requests to a plurality of baseline software instances of a software application program executing on a plurality of hardware platforms and a plurality of canary software instances of the software application program also executing on the plurality of hardware platforms, wherein each of the plurality of baseline software instances comprises a first version of the software application program, each of the plurality of canary software instances comprises a second version of the software application program;
  collect performance data for a plurality of performance metrics measuring a performance of one or more computing devices related to the plurality of baseline software instances executing on the plurality of hardware platforms;
  collect performance data for the plurality of performance metrics measuring a performance of one or more other computing devices related to the plurality of canary software instances executing on the plurality of hardware platforms;
  for each of the plurality of performance metrics:
    calculate, via the one or more hardware processors, an aggregate baseline performance metric for the performance metric by averaging the performance data measuring the performance of the one or more computing devices related to the plurality of baseline software instances; and
    calculate, via the one or more hardware processors, a performance value for each canary software instance included in the plurality of canary software instances by calculating a difference between the aggregate baseline performance metric for the performance metric and the performance data measuring the performance of the one or more other computing devices related to a corresponding canary software instance; and
  calculate, via the one or more hardware processors, a final measure of performance for the second version of the software application program by at least one of:
    calculating an average of the performance values calculated for the canary software instances included in the plurality of canary software instances;
    calculating one or more variances of the performance data for one or more of the canary software instances included in the plurality of canary software instances relative to one or more of the aggregate baseline performance metrics calculated for the plurality of baseline software instances; and
    calculating an average variance of the performance data for the canary software instances included in the plurality of canary software instances relative to the aggregate baseline performance metrics calculated for the plurality of baseline software instances.

12. The system of claim 11, wherein the canary analysis component further configures the processor to:
  determine that a portion of performance data relating to one of the plurality of performance metrics for one of the plurality of canary software instances fails to satisfy one or more quality criteria; and
  exclude the portion of performance data when calculating the final measure of performance for the second version of the software application program, whereby the portion of performance data is not considered in calculating the final measure of performance.

13. The system of claim 12, wherein the one or more quality criteria include at least one of (i) a threshold amount of variance, (ii) one or more error messages relating to the collected performance data, and (iii) a lack of performance data.

14. The system of claim 11, wherein monitoring the plurality of baseline software instances and the plurality of canary software instances to collect performance data comprises:
  deploying a different monitoring agent for each of the plurality of baseline software instances and each of the plurality of canary software instances, wherein each of the monitoring agents is configured to collect performance data relating to the plurality of performance metrics; and
  receiving the performance data collected by at least one of the monitoring agents.

* * * * *